(12) United States Patent
Weinzierle et al.

(10) Patent No.: US 12,130,163 B2
(45) Date of Patent: Oct. 29, 2024

(54) ARRANGEMENT AND METHOD FOR SELECTING A SENSOR-RF MODULE PROPERTY

(71) Applicant: VEGA Grieshaber KG, Wolfach (DE)

(72) Inventors: Christian Weinzierle, Wolfach (DE); Levin Dieterle, Oberwolfach (DE)

(73) Assignee: VEGA Grieshaber KG, Wolfach (DE)

( * ) Notice: Subject to any disclaimer, the term of this patent is extended or adjusted under 35 U.S.C. 154(b) by 0 days.

(21) Appl. No.: 18/261,964

(22) PCT Filed: Jan. 19, 2021

(86) PCT No.: PCT/EP2021/051044
§ 371 (c)(1),
(2) Date: Jul. 18, 2023

(87) PCT Pub. No.: WO2022/156880
PCT Pub. Date: Jul. 28, 2022

(65) Prior Publication Data
US 2024/0159581 A1    May 16, 2024

(51) Int. Cl.
*G01F 15/06* (2022.01)
*G01F 15/00* (2006.01)

(52) U.S. Cl.
CPC .......... *G01F 15/066* (2013.01); *G01F 15/006* (2013.01)

(58) Field of Classification Search
CPC ...... G01F 15/066; G01F 15/006; G01F 15/14; G01F 1/00–13/00; G01D 21/00; G01D 11/245; G01S 7/027; G01S 7/003; H04Q 9/00; H04Q 2209/40
See application file for complete search history.

(56) References Cited

U.S. PATENT DOCUMENTS

| | | | |
|---|---|---|---|
| 6,285,893 B1 | 9/2001 | Keirinbou | |
| 2003/0025612 A1* | 2/2003 | Holmes | H04Q 9/02 340/870.02 |
| 2007/0194913 A1 | 8/2007 | Yokoshima et al. | |
| 2010/0273441 A1* | 10/2010 | Dubash | H04B 1/40 455/150.1 |
| 2013/0135171 A1 | 5/2013 | Desclos et al. | |
| 2013/0210373 A1 | 8/2013 | Dubash et al. | |
| 2014/0315592 A1* | 10/2014 | Schlub | H04W 52/367 455/522 |

(Continued)

FOREIGN PATENT DOCUMENTS

| | | |
|---|---|---|
| CN | 1232325 A | 10/1999 |
| CN | 104729627 A | 6/2015 |

(Continued)

OTHER PUBLICATIONS

International Preliminary Report on Patentability and Written Opinion issued Jul. 20, 2023 in PCT/EP2021/051044, 8 pages.

(Continued)

*Primary Examiner* — Sisay Yacob
(74) *Attorney, Agent, or Firm* — Oblon, McClelland, Maier & Neustadt, L.L.P.

(57) ABSTRACT

An arrangement for a sensor of automation technology, the arrangement selecting a radio module feature, and the radio module feature depending on a sensor structure. The arrangement including a controller that selects the radio module feature according to the sensor structure.

18 Claims, 3 Drawing Sheets

(56) References Cited

U.S. PATENT DOCUMENTS

2015/0022373 A1    1/2015  Bommer et al.
2015/0172426 A1*   6/2015  Asrani ................ H04M 1/0283
                                                          455/575.1

FOREIGN PATENT DOCUMENTS

| EP | 1 648 095 A2   | 4/2006  |
| EP | 1 667 082 A1   | 6/2006  |
| EP | 3 106 842 A1   | 12/2016 |
| EP | 3 179 635 A1   | 6/2017  |
| EP | 3 285 403 A1   | 2/2018  |
| JP | 2006-234394 A  | 9/2006  |
| WO | WO 2020/051195 A1 | 3/2020 |

OTHER PUBLICATIONS

International Search Report issued Oct. 14, 2021 in PCT/EP2021/051044, 14 pages.
International Search Report Issued Oct. 14, 2021, in PCT/EP2021/051044, filed on Jan. 19, 2021, 2 pages.
Chinese Office Action dated Apr. 17, 2024 in corresponding Chinese Patent Application No. 202180090895.0, 11 pages.

* cited by examiner

ARRANGEMENT AND METHOD FOR SELECTING A SENSOR-RF MODULE PROPERTY

FIELD OF INVENTION

The invention relates to an arrangement configured for selecting a radio module feature for a sensor of automation technology, a communication module, a sensor, a method for selecting a radio module feature for a sensor, a program element and a use of the arrangement for selecting a radio module feature for a fill level sensor, for a point level sensor, for a flow sensor or for a pressure sensor.

BACKGROUND OF THE INVENTION

Depending on the requirements for mechanical stability, chemical resistance or UV stability, sensors in process and automation technology have housings made of suitable materials. These can be UV-stable plastic, aluminum or stainless steel, for example. If the functional scope of such a sensor is to be extended with a radio communication module, the technical problem arises that the antenna of the radio communication module requires a different adaptation depending on the material of the sensor structure, such as the surrounding housing.

DISCLOSURE OF THE INVENTION

An object of the invention could be to provide a device that exhibits good radio characteristics that are largely independent of the sensor setup.

The object is solved by the subject matter of the independent patent claims. Advantageous embodiments are the subject of the dependent claims, the following description, and the figures.

The described embodiments similarly relate to the arrangement arranged to select a radio module feature (radio module property or radio model characteristic) for an automation technology sensor, the use of the arrangement, the communication module, the sensor, the method for selecting a radio module feature (radio module property or radio module characteristic) for the sensor, and the program element. Synergistic effects may result from various combinations of the embodiments, although they may not be described in detail.

It should also be noted that all embodiments of the present invention involving a process may be carried out in the order of steps described, but this need not be the sole and essential order of steps of the process. The methods disclosed herein may be carried out with a different order of the disclosed steps without departing from the particular method embodiment, unless expressly stated otherwise below.

Technical terms are used in the ordinary way. When certain terms are assigned a specific meaning, definitions of terms in the context of which the terms are used are given below.

According to a first aspect, an arrangement for an automation technology sensor is provided, wherein the arrangement is configured to select a radio module feature, and wherein the radio module feature depends on a sensor structure. The arrangement comprises a controller arranged to select the radio module feature according to the sensor setup.

The radio module feature is a radio-relevant property, such as an electrical, electromagnetic or general physical property. In particular, this also includes specific electrical, electromagnetic values that result from parameters of a circuit or of data transmission or radio transmission, for example parameters of a physical transmission level.

In this disclosure, the term "radio communication module" is synonymous with the shorter term radio module. Accordingly, the term "radio module feature" refers to the radio module or the radio communication module. The radio communication module is a transmitter and/or receiver module of the sensor.

The sensor structure is characterized in particular by parameters such as its shape, size and material properties. These mechanical parameters can have an impact on the quality of the radio transmission, especially if the antenna is located inside the sensor. For example, the sensor assembly may have a housing, a cover, a glass window integrated into the cover, and other elements.

For example, a controller may include an electronic device containing hard-wired or programmable logic, or a circuit of discrete electronic devices, or a combination thereof. Thus, the controller may include circuitry without programmable logic, or may be or include, for example, a microcontroller, a field programmable gate array (FPGA), an ASIC, a complex programmable logic device (CPLD), or any other programmable logic device known to those skilled in the art.

The selection of a radio module feature is the selection of one of several available radio module properties. This can be realized by e.g. switching components or circuits on, off or over. The switching on, off, or toggling may also include the simultaneous switching of multiple devices or circuits to achieve the desired radio module feature. A selection can also be the selection of a certain radio module feature, which is set by the controller, for example by a digital or analog control of a tuning circuit or an electronic component.

The term automation technology is to be interpreted broadly here and includes, among others, process automation and factory automation.

According to an embodiment, the arrangement further comprises a receiver configured to receive values of a sensor-external signal strength measurement of a signal transmitted by the arrangement, and the controller is configured to select the radio module feature based on the received values. The receiver may be, for example, a receiver already configured to receive data such as control data or configuration data for the sensor.

In other words, the radio module for which the controller selects the radio module feature sends a signal, which may include data packets, for example, to a receiving device external to the sensor. The receiving device measures one or more reception parameters, such as a received signal strength or a received signal-to-noise ratio, and sends the measurement result back to the sensor. According to the embodiment, the arrangement now comprises a receiver arranged to receive the measurement result from the external device. The controller is configured to evaluate the measurement result, and to select the radio module feature according to the evaluation result. This can also be done via an iterative process, for example.

In an example, two selectable radio module properties A and B are available. The controller causes the sensor to transmit a signal under radio module feature A, whereupon the receiver in the sensor receives back a measurement result, e.g. a signal strength value, which it transfers to the controller. The controller can now compare the value with a predefined signal strength value, for example, and, if the value falls below a threshold value, set or switch the radio module properties B for the further operating time of the sensor.

In another example, the controller causes the sensor to first send a signal under radio module feature A and then to send a signal under radio module feature B. The receiver in the sensor receives both measurement results so that the controller can compare the two measurement results and select the radio module feature that has provided a better measurement result, e.g., a higher signal strength value. The receiver in the sensor receives both measurement results so that the controller can compare the two measurement results and select the radio module feature that has provided a better measurement result, e.g. a higher signal strength value.

According to an embodiment, the arrangement comprises at least one switch, wherein in each switch position a different circuit determining the radio module feature is active, and the controller is arranged to effect the radio module feature by switching the switch. The switching circuit may be, for example, an antenna circuit or a frequency circuit.

According to an embodiment, the circuit(s) are antenna impedance matching networks.

That is, in this case, the radio module feature is a property that corresponds to a matched impedance of the antenna drive. For example, the antenna requires a different matching depending on the surrounding housing, i.e., the impedance of the radio module must be selected according to the housing, in particular the housing material, in such a way that the impedance of the antenna in this environment is matched to the impedance of the circuit providing the radio frequency signal. To this end, there is, in one example, a first matching network that matches this antenna impedance to the high-frequency circuit in the case of a plastic housing, as well as a second matching network that matches this antenna impedance to the high-frequency circuit in the case of a stainless steel housing, and a third matching network that matches this antenna impedance to the high-frequency circuit in the case of an aluminum housing. After a determination of the best signal quality, transmitting or receiving power or the type of housing, e.g. according to the housing material, a matching network is selected and the input of the matching network is connected to high frequency circuit by e.g. a switch and the output of the matching network is connected to the antenna. The switch causes, e.g., a changeover so that simultaneously the other matching networks are disconnected from the high-frequency path and the antenna on the input and output side, respectively.

According to an embodiment, the arrangement is arranged to achieve the radio module feature by changing values of one or more electronic components. For example, in a matching network, instead of switching from one complete matching network to another matching network, a tap of an inductor, resistor, or capacitor may be selected so that the corresponding value of that component changes, and thus the impedance of the matching network changes. Accordingly, a frequency, a frequency filter characteristic, or other relevant parameters could also be changed.

According to an embodiment, the sensor structure is characterized by a housing material. Depending on the requirements for mechanical stability, chemical resistance or UV stability, sensors in process and automation technology have housings made of suitable materials. This can be, for example, a UV-stable plastic, aluminum or stainless steel.

The sensor design can be variable. In particular, the housing can be changed. For example, the housing or frame of the sensor has a thread so that the housing, e.g., a plastic housing can be removed from the sensor and another housing, e.g., a metal housing, can be screwed on. The material, or type, of housing used may depend, for example, on the environment of use and the application. For example, a chemical environment may be unsuitable for plastic, or a plastic housing may be more economical, but may need to meet conditions such as UV stability.

According to an embodiment, the arrangement is arranged to determine an electrical property of the housing material. Thus, in addition or alternatively to the measurement receiver described above, the arrangement has a circuit that measures an electrical property of the sensor assembly such as the housing and sends a digital or analog measurement signal to the controller so that the controller can evaluate the signal or data and select the radio module feature.

According to an embodiment, the electrical property is a capacitance and/or a conductivity. That is, to stay with the above example, the arrangement may comprise a circuit that measures the capacitance or the conductance, or a resistance as an electrical property, where the capacitance or the conductance is characteristic of a sensor structure, such as a housing or a housing material, and the controller selects the radio module feature, such as the impedance or other parameters described herein, e.g., by a switch.

According to an embodiment, the controller is arranged to retrieve the package material and/or electrical properties from a database, a stored configuration, and/or a received configuration. Preferably, one of these is selected, but any permutation thereof may be applied. For example, the controller queries the package material from a memory module, where the memory is volatile or non-volatile memory. For example, the configuration may be permanently implemented for the sensor or transmitted via, for example, a wireless link and stored in the memory. The memory may be located, for example, in the arrangement or another electronic unit of the sensor. The configuration can further be achieved via a manual input. Alternatively, the controller initiates a database query via, for example, a radio link to a server. For this purpose, the logic of the controller may have client software, for example.

According to an embodiment, the radio module feature is a radiated energy. For example, the controller may decide that the energy for transmitting data needs to be increased by a measurement result received from an external device or by a determination of the housing material or electrical properties of the housing.

This embodiment may be applied generally or may come into play, for example, when it is determined that, despite other adjustments, the quality or performance due to the sensor design is not sufficient to transmit data with sufficient accuracy.

The radiated energy is defined, for example, by a transmission strength or a data rate. The transmission strength or transmission power directly influences the radiated RF energy. If the transmit power is fixed and therefore cannot be changed, the data rate can also be reduced, for example. The data rate influences the energy per bit, for example, and is decisive when decoding the data. It should be noted here again that under radio module feature, as mentioned at the beginning, can also be the value of a parameter such as the impedance, the transmit power or the data rate.

According to an embodiment, the radio module feature is a modulation, a radio standard and/or a frequency. The electrical properties of the package may result in, for example, the signal being distorted and the modulation type no longer allowing error-free decoding, so that this must be changed. Accordingly, the coding method could also be changed, for example to achieve higher redundancy and/or improved error detection and/or error correction. Signal distortion may be caused, for example, by interference caused, for example, by reflections associated with, for example, the housing or its transmission of unwanted electromagnetic waves. The choice of modulation, coding method and radio standard requires that suitable alternatives are available and made possible by the radio standard used. For example, a suitable radio standard is a LoRa, LoRaWAN, NB-IOT, Cat-M1, Sigfox, Mioty, Bluetooth or a comparable standard.

In one example, the arrangement includes a user interface such as a manual switch, a touch-sensitive screen, a push button, or an external wired or wireless interface, such as a Bluetooth, NFC, WLAN, or cellular interface to a smartphone, a laptop, or a tablet, through which an input can be made to select the radio module feature.

According to a further aspect, there is provided a communication module comprising an arrangement described herein, wherein the communication module further comprises an antenna and a radio module, wherein the antenna is connected to the radio module, and wherein the radio module is arranged to receive from the controller of the arrangement a radio module feature selected by the controller. The radio module may be arranged to send data packets to an external receiver so that the receiver can, for example, measure signal strength and send the measurement result back to the sensor or a receiver in the communication module. In one example, the antenna is switchably connected to the radio module via a first network or a second network for matching the antenna impedance.

According to a further aspect, there is provided a sensor comprising a communication module having an arrangement for selecting a radio module feature as described in the present disclosure. The sensor further comprises, for example, a structure comprising a housing on which the selection of the radio module feature depends. The housing may be made of metal such as stainless steel or aluminum, a plastic, or other material.

According to a further aspect, a method for selecting a radio module feature for an automation technology sensor is provided, wherein the radio module feature depends on a sensor structure, and wherein the controller selects the radio module feature according to the sensor structure.

In one example, the method has the following steps:
determining a sensor structure, for example, a housing type, selecting a radio module characteristic, for example, an antenna network impedance, a frequency, a modulation type, or a radio standard, and switching an electronic component, circuit such as an antenna matching network to match the impedance and/or a radio standard, etc., so that the selected radio module feature takes effect. Determining a sensor assembly may include, for example, determining electrical characteristics of the package by measuring package capacitance or package conductivity. Determining a sensor setup may alternatively or additionally be done by receiving a measurement result preceded by a transmission of a signal by the sensor. In the latter case, the sensor setup need not be explicitly determined. It is sufficient to determine whether the current radio module feature is suitable for the current sensor setup or which of the tried radio module properties is the most suitable. The steps are controlled by the controller, as well as executed at least in part by the controller itself, as described above and in the embodiment examples.

According to an aspect, a program element, such as a computer program element, is provided that, when executed on the controller of the device, performs the steps of the method. The program element may be part of a computer program, but it may also be an entire program in itself. For example, the program element may be used to update an existing computer program to arrive at the present invention.

The program element may be stored on a provided computer-readable medium. The computer-readable medium may be considered to be a storage medium, such as a memory chip, a USB flash drive, a CD, a DVD, a data storage device, a hard drive, or any other medium on which a program element as described above may reside.

According to another aspect, a use of an arrangement described herein for selecting a radio module feature for a level sensor, a point level sensor, a flow sensor, or a pressure sensor is provided.

BRIEF DESCRIPTION OF THE DRAWINGS

In the following, embodiments of the invention are explained in more detail with reference to the schematic drawings. Here shows FIG. 1 a schematic diagram of a sensor with an arrangement for selecting a radio module feature, FIG. 2 a block diagram of a radio communication module, FIG. 3 a flowchart of a method for selecting a radio module feature for an automation technology sensor, FIG. 4 a sketch showing an arrangement for capacitive determination of the housing material.

EMBODIMENTS

Parts corresponding to each other are marked with the same reference signs in all figures. The invention is explained primarily with reference to an example embodiment in which an antenna matching network is selected and switched, the selection being made in accordance with the housing material which is determined in a mold. However, this example does not limit the invention.

Figure 1:
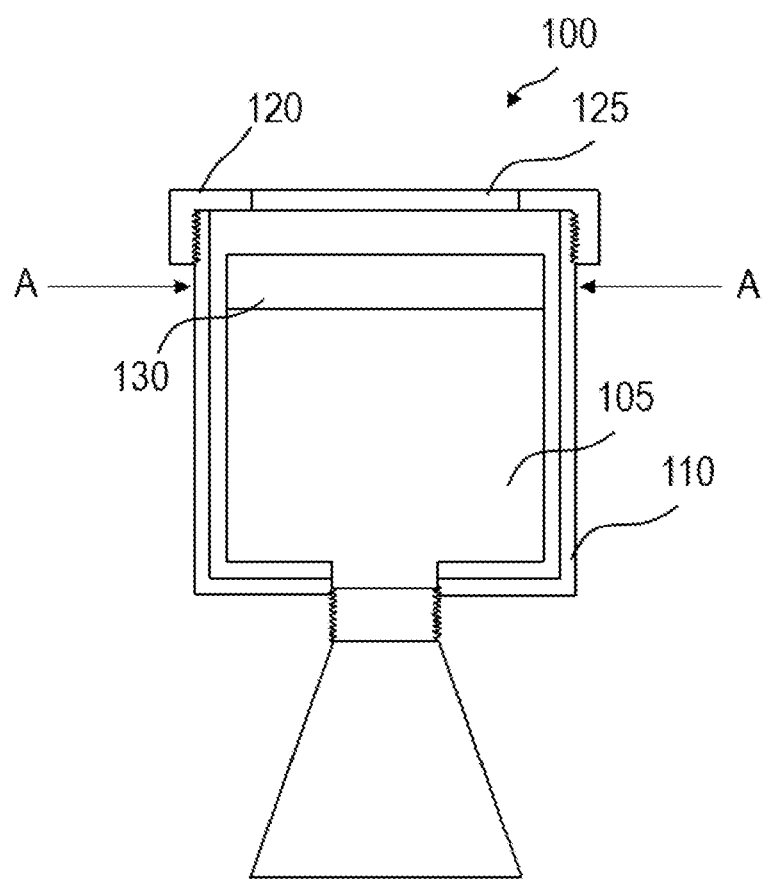

FIG. 1 schematically shows an industrial sensor 100 of the automation technology, which comprises an electronic unit 105, a sensor housing 110, which consists for example of plastic, aluminum or also stainless steel, and a screw-off housing cover 120, which normally consists of the same material as the sensor housing 110. The communication module 130 may be retrofitted and includes an arrangement for selecting a radio module feature of a radio module of the communication module 130. In the case of a metallic housing 110, a glass viewing window 125 may be provided in the cover 120, for example, to allow data to be sent by the complementary communication module 130 from within the sensor housing 110.

Figure 2:
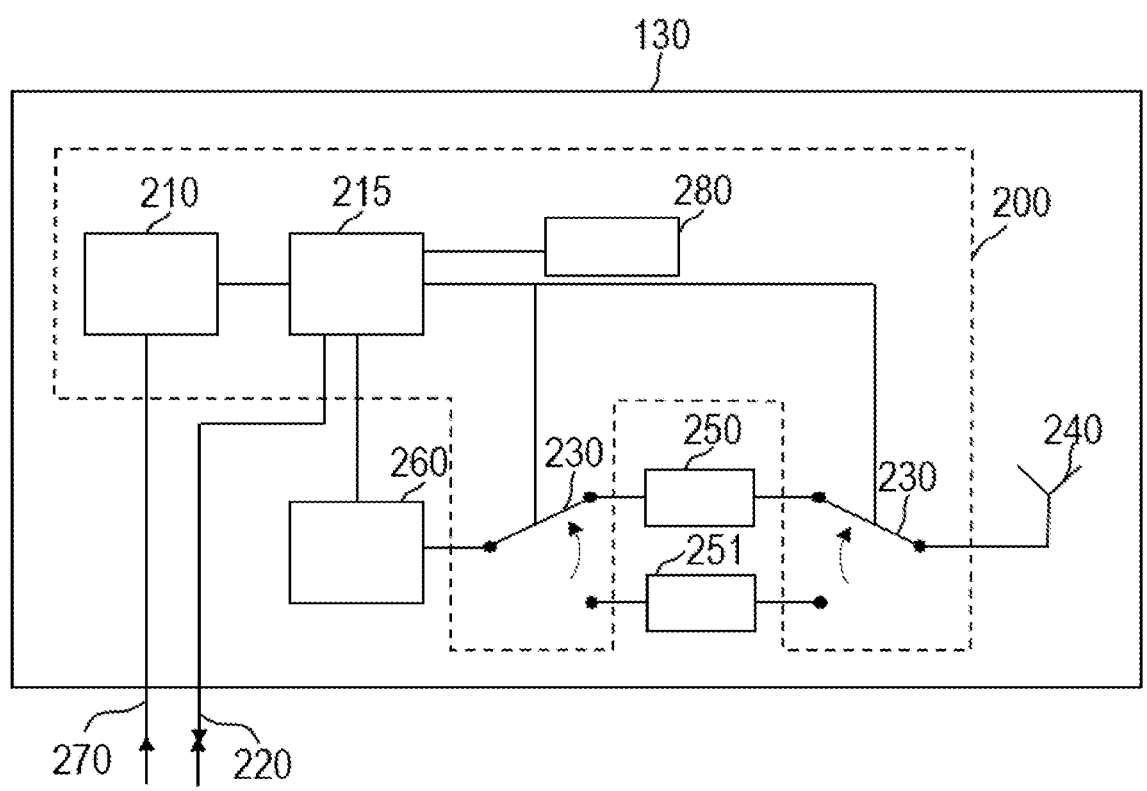

In an embodiment, FIG. 2 shows a block diagram of the radio communications module 130 that complements the sensor, including an arrangement 200 for selecting a radio module feature, a radio module 260, an antenna 240, and two matching networks 250 and 251 for matching the impedance for the antenna 240. In FIG. 2, the antenna 240 is connected to the radio module 60 via the matching network 250. The module draws its energy 270 from the sensor electronics 105 shown in FIG. 1, which can be temporarily stored, or collected, in an energy buffer 210, such as a battery or capacitor. All components of the communication module 130 draw their energy from this energy buffer 210. On the one hand, the microcontroller 215 controls the communication 220 with the sensor electronics 105 and prepares the data to be transmitted. Furthermore, in this example, it controls the adaptation of the transmitting antenna 240 to the radio module 260.

Depending on the installation situation, i.e., the sensor structure 110, 120, 125, the microcontroller 215 may switch to a corresponding matching network 250 and 251 for matching the impedance for the antenna 240. The at least two antenna matching networks 250, 251 are discrete as shown herein. Alternatively, they may be a single antenna matching network that is electronically tunable.

The arrangement 200 may further comprise a module 280, which may be, for example, a receiver that may receive a measurement result from an external sensor, for determining the sensor setup. The measurement result indicates, for example, a signal strength or signal-to-noise ratio at which the external receiver received a signal radiated from the communication module 130 via the antenna 240. The module 280 may further be a memory unit from which the controller may read one or more values that are related to the housing property and indicative of, for example, a housing material so that the controller may decide, for example, which matching network 250, 251 to select. The module 280 may further be a user interface such that the user can input the housing property, or a client for receiving corresponding configuration data from an external server and/or database and/or smartphone. The module may also be a sensor or circuit that determines, for example, the electrical properties such as capacitance or conductivity of the enclosure. The module 280 may also be an interface to a memory of the electronic unit 105, which is read out via this, and in which corresponding sensor assembly data is stored. In a very simple case, a bit or flag is sufficient to indicate, for example, "metallic" and "non-metallic" for a package property.

Figure 3:
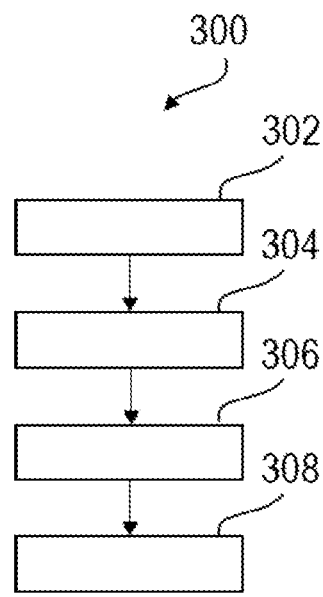

FIG. 3 illustrates a corresponding method 300 for selecting a radio module feature for an automation technology sensor 100, for example, for matching the antenna 240 of the radio communication module 130 to the housing of the sensor. In the first step 302, the radio communication module 130 is placed on the electronic module 105 of the sensor 100. This can be done, for example, by means of a screw, plug-in or snap-on mechanism. In a further step 304, power is supplied to the radio communication module 130 via the electronics module 105 of the sensor. The determination of whether the radio communication module 130 is installed in a metal or plastic housing is carried out in step 306 and can be carried out using different methods.

For example, the complementary radio communication module 130 may send at least two data packets with different matching of the antenna 240. The quality of the respective matching can be qualitatively determined via the determined received signal strength indicator (RSSI) at a receiver, for example a LoRa gateway, or the measured signal-to-noise ratio (SNR) and communicated to the communication module 130 via bidirectional communication. The antenna matching with which a higher received signal strength or a better signal-to-noise ratio has been achieved is retained for future communication as long as the communication module is supplied with power.

Alternatively, the installation situation can be sensed by means of a capacitive measurement by the arrangement 200 itself, e.g. the module 280 of the arrangement 200.

In another embodiment, the arrangement 200 can read the sensor setup, such as installation situation, installation type or material of the housing via a parameter from the sensor electronics 105. In yet another embodiment, the arrangement 200 may query the installation situation via a database using the serial number of the sensor electronics 105. In still another embodiment, the sensor installation is communicated to the arrangement 200 by means of a manual input.

In step 308, the corresponding antenna matching of the radio communication module 130 is maintained as long as the power supply is not interrupted or disconnected. In this case, it can be assumed that the module 130 has been installed in a different sensor with possibly different housing material and thus the antenna matching must be determined again.

Figure 4:
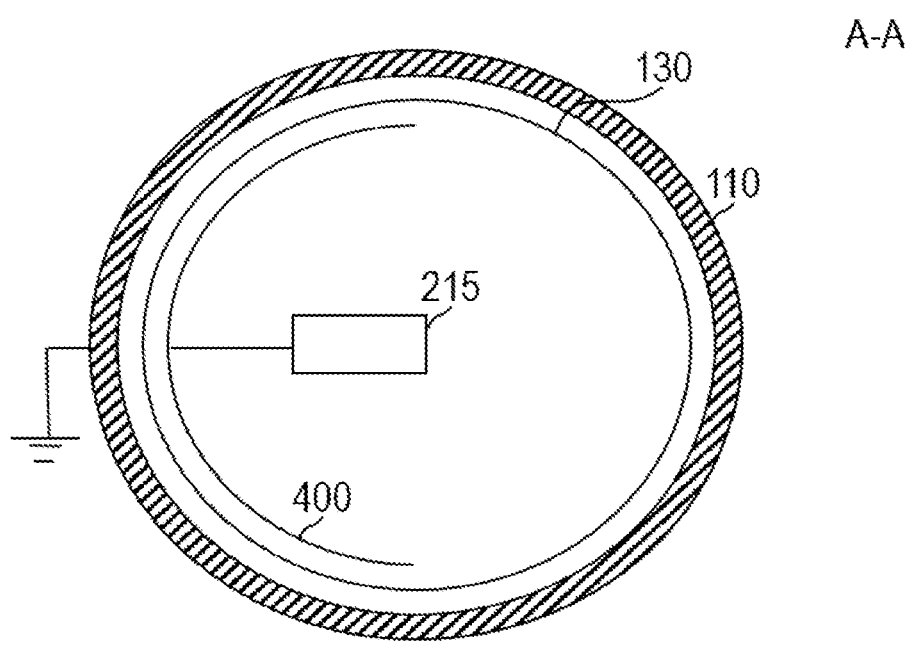

FIG. 4 shows an embodiment with an arrangement that enables capacitive determination of the type of sensor housing material. A section through the communication module 130 and the sensor housing 110 is shown according to the section plane A marked in FIG. 1. For this purpose, the capacitance between the sensor housing 110 and a counter electrode 400 located in the communication module 130 is determined. In the simplest case, this can be done via a port pin of the microcontroller 215. If the communication module 130 is mounted in a grounded, metallic housing, the capacitance measured in this way is many times higher compared to a plastic housing. Based on the measured capacitance, the microcontroller can set the matching network according to the present package.

Other variations of the disclosed embodiments may be understood and carried out by those skilled in the art in carrying out the claimed invention by studying the drawings, the disclosure, and the appended claims. In the claims, the word "comprising" does not exclude other elements or steps, and the indefinite article "a" or "an" does not exclude a plurality. A single processor or other unit may perform the functions of multiple items or steps recited in the claims. The mere fact that certain actions are recited in interdependent claims does not mean that a combination of those actions cannot be advantageously used. A computer program may be stored/distributed on a suitable medium such as an optical storage medium or a semiconductor medium provided with or as part of other hardware, but may also be distributed in other forms, for example, via the Internet or other wired or wireless telecommunications systems. Reference signs in the claims should not be construed to limit the scope of the claims.

The invention claimed is:

1. An arrangement configured for selecting a radio module property for a sensor of automation technology, comprising:
a controller,
wherein the radio module property depends on a sensor structure, and
wherein the controller is configured to select the radio module property according to the sensor structure,
wherein the sensor structure is characterized by a housing material, and
wherein the controller is further configured to determine an electrical property of the housing material to select the radio module property.

2. The arrangement of claim 1, wherein the arrangement further comprises a receiver configured to receive values of a sensor-external signal strength measurement of a signal transmitted by a device, and wherein the controller is further configured to select the radio module property based on the received values.

3. The arrangement according to claim 1, further comprising at least one switch, wherein in each switch position a different circuit determining the radio module property is active, and the controller further is configured to affect the radio module property by switching the switch.

4. The arrangement according to claim 3, wherein the circuit determining the radio module property is an antenna impedance matching network.

5. The arrangement according to claim 1, wherein the radio module property is achieved by changing values of one or more electronic components.

6. The arrangement according to claim 1, wherein the electrical property is a capacitance and/or a conductivity.

7. The arrangement according to claim 1, wherein the controller is configured to query housing material and/or electrical properties from a database, a stored configuration, and/or a received configuration.

8. The arrangement according to claim 1, wherein the radio module property is a radiated energy.

9. The arrangement according to claim 1, wherein the radio module property is a modulation, a radio standard, and/or a frequency.

10. A communication module comprising:
the arrangement according to claim 1,
wherein the communication module further comprises an antenna and a radio module,
wherein the antenna is connected to the radio module, and
wherein the radio module is configured to receive from the controller of the arrangement a radio module property selected by the controller.

11. A sensor comprising:
the communication module according to claim 10,
wherein the sensor further comprises a sensor structure on which the selection of the radio module property depends.

12. A method for selecting a radio module property for an automation technology sensor including a communication module having an arrangement configured for selecting the radio module property for a sensor of automation technology including a controller, wherein the radio module property depends on a sensor structure, wherein the communication module further comprises an antenna and a radio module, wherein the antenna is connected to the radio module, wherein the radio module is configured to receive from the controller of the arrangement a radio module property selected by the controller, and wherein the sensor further comprises the sensor structure on which the selection of the radio module property depends, comprising:
selecting, by the controller, the radio module property according to the sensor structure,
wherein the sensor structure is characterized by a housing material, and
wherein the controller is further configured to determine an electrical property of the housing material to select the radio module property.

13. A non-transitory computer readable medium having stored thereon a program element that, when executed on the controller of the arrangement causes the controller to implement the method according to claim 12.

14. The arrangement according to claim 2, further comprising at least one switch, wherein in each switch position a different circuit determining the radio module property is active, and the controller further is configured to affect the radio module property by switching the switch.

15. The arrangement according to claim 2, wherein the radio module property is achieved by changing values of one or more electronic components.

16. The arrangement according to claim 3, wherein the radio module property is achieved by changing values of one or more electronic components.

17. The arrangement according to claim 4, wherein the radio module property is achieved by changing values of one or more electronic components.

18. The arrangement according to claim 2, wherein the controller is configured to query the housing material and/or the electrical properties from a database, a stored configuration, and/or a received configuration.

* * * * *